(12) United States Patent
Pisczak

(10) Patent No.: US 6,595,472 B1
(45) Date of Patent: Jul. 22, 2003

(54) CABLE CLAMP

(75) Inventor: Philip J. Pisczak, Chagrin Falls, OH (US)

(73) Assignee: Preformed Line Products Company, Mayfield Village, OH (US)

( * ) Notice: Subject to any disclaimer, the term of this patent is extended or adjusted under 35 U.S.C. 154(b) by 0 days.

(21) Appl. No.: 10/034,753

(22) Filed: Dec. 28, 2001

(51) Int. Cl.7 .................................................. F16L 3/08
(52) U.S. Cl. ...................................................... 248/74.1
(58) Field of Search .............................. 248/74.1, 74.4, 248/73, 65, 62

(56) References Cited

U.S. PATENT DOCUMENTS

| | | | |
|---|---|---|---|
| 1,063,852 A | * 6/1913 | Carpenter et al. | 248/74.4 |
| 1,638,230 A | 8/1927 | Alsaker | |
| 1,769,891 A | 7/1930 | Steinmayer | |
| 1,991,690 A | 2/1935 | McCoy | |
| 2,550,001 A | 4/1951 | Button | |
| 2,651,766 A | 9/1953 | Runde | |
| 2,779,815 A | 1/1957 | Sokol | |
| 2,887,669 A | 5/1959 | Sylvester | |
| 2,975,997 A | 3/1961 | Lindsey | |
| 2,984,441 A | 5/1961 | Dalmasso | |
| 3,026,368 A | 3/1962 | Lindsey | |
| 3,431,538 A | 3/1969 | Hubbard et al. | |
| 3,437,742 A | 4/1969 | Lindsey | |
| 3,553,351 A | 1/1971 | Lindsey | |
| 3,633,858 A | 1/1972 | Houston | |
| 4,281,213 A | 7/1981 | Sciscione | |
| 4,383,668 A | 5/1983 | Hall | |
| 4,393,998 A | * 7/1983 | Allen et al. | 156/306.9 |
| 4,995,753 A | 2/1991 | Shook | |
| 5,014,941 A | 5/1991 | Sherman | |
| 5,435,507 A | 7/1995 | Murphy | |
| 5,494,245 A | * 2/1996 | Suzuki et al. | 24/487 |
| 5,689,862 A | 11/1997 | Hayes et al. | |
| 5,893,538 A | 4/1999 | Onishi et al. | |
| 6,030,006 A | 2/2000 | Lin | |
| 6,135,398 A | * 10/2000 | Quesnel | 248/74.1 |

FOREIGN PATENT DOCUMENTS

| | | | |
|---|---|---|---|
| CA | 576602 | | 5/1959 |
| DE | 3708065 A1 | * | 9/1988 |

OTHER PUBLICATIONS

Transmission & Distribution Product Catalog of Preformed Line Products, Jul. 1999: pp. 157–168—Section 4 Attachment Hardware for Special Conductors—Helical Products for T–2 Conductor; Cushion–Grip Clamp for T–2; Oval Conductor Products.

Transmission & Distribution Product Catalog of Preformed Line Products, Jul. 1999: pp. 289–301—Section 11 Fiber Optic Products—Fiber Optic Product Layout—ADSS and OPGW; Fiberlign® Dead–end for OPGW; Fiberlign® Suspension for OPGW; Fiberlign® Formed Wire Dead–end for OPGW; Fiberlign® Cushion Clamp for OPGW.

* cited by examiner

Primary Examiner—Ramon O. Ramirez
(74) Attorney, Agent, or Firm—Fay, Sharpe, Fagan, Minnich & McKee, LLP

(57) ABSTRACT

A cable clamp (10) includes two interchangeable half-portions (14, 16). Each half-portion (14, 16) includes an outer side, an inner side including a cable receiving region (18, 20), a hinge region (30, 32) arranged below the cable receiving region (18, 20), and a suspending region (70) arranged above the cable receiving region (18, 20). The suspending region (70) is adapted to receive an associated support element (72). The two half-portions (14, 16) are adapted to cooperatively form a unitary cable clamp body having a cable channel (22) defined by the two cable receiving regions (18, 20) and a hinge (36) including the two hinge regions (30, 32). A tightener (54) is arranged above the cable channel (22) for drawing the half-portions (14, 16) together about the hinge (36) to clamp an associated cable (12) within the cable channel (22).

51 Claims, 6 Drawing Sheets

CABLE CLAMP

BACKGROUND OF THE INVENTION

The present invention relates to the cable suspension arts. It particularly relates to apparatus and methods for suspending high tension cables mounted aerially using poles or other overhead support structures, and will be described with particular reference thereto. However, the invention also finds application in conjunction with other uses where cables for the transmission of power or communication signals are fastened, clamped, affixed, or otherwise mechanically supported or constrained, such as in the suspension of optical ground wires (OPGW's).

Power cables are frequently suspended aerially from poles or other support structures. An aerial arrangement of such cables has the advantages of relatively simple and flexible installation having a limited ground footprint, and permits space substantially below the cables to be used for other purposes. An aerial arrangement also separates the cables from contact with people or roaming ground animals. Spatial separation is particularly important for high tension electrical power transmission cables for safety reasons. Separation of any cable helps protect the cable from damage caused either inadvertently or through malicious vandalism.

Although aerial cables are relatively safe from ground-based sources of damage, they are subject to environmental wear and damage, principally due to winds. Well known in the art are problems caused by aeolian vibration which is a high frequency, low amplitude vibration caused by laminar winds passing across the line, as well as galloping which is a low frequency, high amplitude wind-induced cable motion. Aeolian vibration, galloping,, and other wind action can produce cable damage especially at the suspension points where cable clamps and other supporting devices mechanically stress the cable. Cable damage in the form of abrasion, wear, and fatigue can occur especially at the clamping points.

The prior art includes a large number of cable clamp styles. A type of clamp commonly used for high tension power cable suspension employs a pair of upper and lower clamp body portions that sandwich the cable in vertical fashion (top-and-bottom) and are clamped using bolts, rods, or other fasteners. These cable clamps are formed from a plurality of parts which remain separate until assembly in the field. This being the case, the bolts, rods, or other fasteners are susceptible to misplacement or mishandling in the field, particularly in rainy, snowy, or other adverse weather conditions. The fastening of the clamp usually requires simultaneous manipulation of both a bolt and an associated fastening nut in order to effectuate the clamping. This requires two hands, and can be particularly problematic when installing the clamp on an electrified cable. Furthermore, two dissimilar clamp body portions are paired to form the clamp body, further increasing the possibility of encountering missing clamp parts during field assembly. As the two clamp halves are mounted above and below the cable, the clamping force is added to the weight-induced bending stress of the cable.

U.S. Pat. No. 2,887,669 issued to J. Sylvester discloses a cable connector having two identically formed clamp body portions, which reduces the number of differentiated parts. U.S. Pat. No. 3,633,858 issued to H. J. Houston et al. discloses a spring clamp in which the spring clamp member is held against a rigid clamp member using an adjustable bolt. In both these clamps, the cable is retained near an outer edge of the clamp device, which limits the security of the clamping. The cable is also not surrounded by retaining hardware, and so the cable can be lost in the event of clamp slippage.

U.S. Pat. No. 5,435,507 issued to M. W. Murphy discloses a cable support for installation on a rigid pole. This clamp is operatively similar to the Houston clamp except that the spring clamp member is replaced by a second rigid clamp member. The two rigid clamp members are dissimilar.

The present invention contemplates an improved cable clamp which overcomes the aforementioned limitations and others.

SUMMARY OF THE INVENTION

According to one aspect of the invention, a cable clamp including two interchangeable half-portions is provided. Each half-portion includes an outer side, an inner side including a cable receiving region, a hinge region arranged below the cable receiving region, and a suspending region arranged above the cable receiving region. The suspending region is adapted to receive an associated support element. The two half-portions are adapted to cooperatively form a unitary cable clamp body having a cable channel defined by the two cable receiving regions and a hinge including the two hinge regions. A tightener is arranged above the cable channel for drawing the half-portions together about the hinge to clamp an associated cable within the cable channel.

According to another aspect of the invention, a piece is disclosed, including an outer side, an inner side having a cable receiving region, a hinge region arranged below the cable receiving region, and a suspending region arranged above the cable receiving region, the suspending region adapted to receive an associated support element. The piece is adapted to cooperate with a similar piece to form a unitary cable retaining body having a cable channel defined by cooperating cable receiving regions, a hinge including cooperating hinge regions and an associated hinge fastening element, and a clamping element arranged to pivotally close the cooperating pieces about the hinge.

According to another aspect of the invention, a cable-retaining device is disclosed. A hinged pair of elements are adapted to receive an associated cable therebetween. A clamp is adapted to compress the hinged pair of elements together to fasten about the associated cable.

According to yet another aspect of the invention, a cable clamp is disclosed. A first body member and a second body member cooperate to form a unitary clamp body. The clamp body has a cable channel, a hinge region arranged on a side of the cable channel, and a compression region arranged on an opposite side of the cable channel away from the hinge region. A hinge fastener hingeably attaches the first and second body members in the hinge region. A clamp draws the first and second body members together in the compression region to compressively hold an associated cable arranged within the cable channel.

According to still yet another aspect of the invention, a cable clamp is disclosed. A left clamp member and a right clamp member together define a clamp body. A hinge is formed into a lower portion of the clamp body. A tightening member is disposed in an upper portion of the clamp body. A cable channel formed into the clamp body is arranged between the hinge and the tightening member.

One advantage of the present invention is that the clamp body is constructed from two identical, interchangeable portions, which simplifies manufacturing and assembly.

Another advantage of the present invention is that it includes a clamping operation employing a nondetachably attached hinge and captive hardware to reduce or eliminate the number of separate parts which must be assembled in the field.

Another advantage of the present invention is that the cable is securely retained in a cable channel arranged away from edges of the clamp.

Another advantage of the present invention is that the clamp can be pre-assembled and placed as a single unit onto a hot, electrified cable using an insulated lifting pole. This simplifies installation of the suspension clamp onto hot wires, and makes the installation safer.

Another advantage of the present invention is that the clamping action occurs horizontally (i.e., left-and-right) at right angles to the cable weight-induced bending stress.

Yet another advantage of the present invention is that the bolt-and-nut fasteners are received by recesses adapted to receive at least one of the bolt head and the nut in non-rotatable fashion. In this way, the bolt-and-nut fastener can be tightened using only the bolt head or only the nut.

Still yet another advantage of the present invention is that the clamp includes one or more cushions that reduce mechanical stress on bending portions of the clamped cable.

Numerous additional advantages and benefits of the present invention will become apparent to those of ordinary skill in the art upon reading the following detailed description of the preferred embodiments.

BRIEF DESCRIPTION OF THE DRAWINGS

The invention may take form in various components and arrangements of components, and in various steps and arrangements of steps. The drawings are only for the purpose of illustrating preferred embodiments and are not to be construed as limiting the invention.

DETAILED DESCRIPTION OF THE PREFERRED EMBODIMENTS

Figure 1:
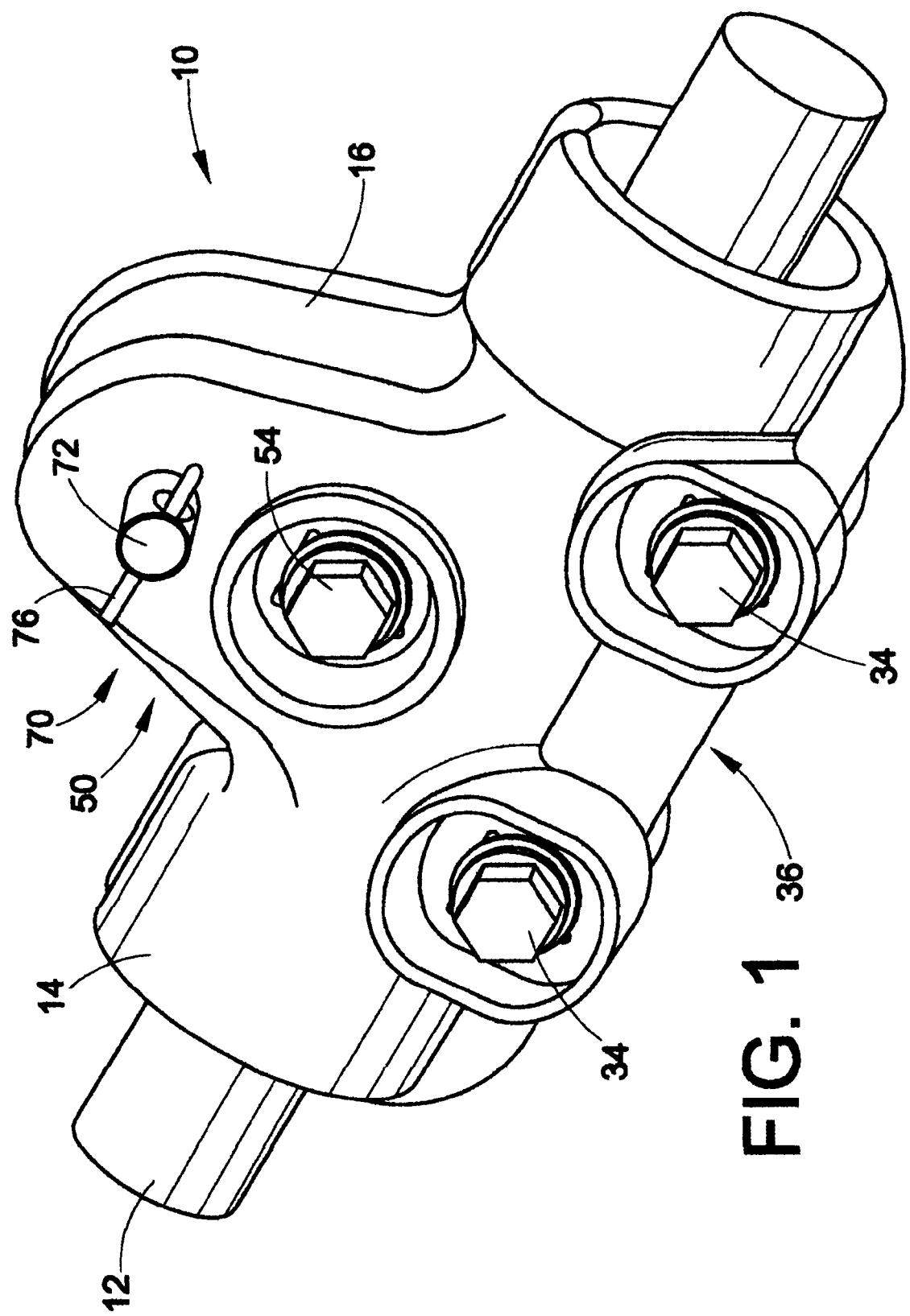
FIG. 1 shows an isometric view of an exemplary cable suspension clamp that suitably practices an embodiment of the invention.

With reference to FIGS. 1 through 6, an exemplary cable suspension clamp 10 that suitably practices an embodiment of the invention is described. The clamp 10 is used to aerially suspend an associated cable 12 from a support wire, support post extension, or other supporting structure (not shown). In the first preferred embodiment of FIGS. 1 through 4, the cable 12 is a bare (uninsulated) aluminum conductor cable of a type known in the art for transmitting electrical power at high voltages such as in the kilovolt range. However, the cable clamp is readily adapted to function with essentially any type of cable, including lower power electrical distribution cables, telephone cables, cable television cables, fiber optical cable bundles such as optical ground wires (OPGW's) known to the art, and the like. For supporting optical fibers, a helical structural reinforcing rod (not shown) formed of aluminum or a similar material is selectively provided for improving the structural integrity of the clamping.

The clamp 10 includes a main clamp body formed from two body portions 14, 16. In the clamp 10, the two body portions 14, 16 are identically formed and interchangeable, thus simplifying manufacturing and assembly of the clamp 10. However, it is to be appreciated that the body portions 14, 16 can be selectively formed to be non-interchangeable as desired. For example, one body portion may be modified to include an integral support bracket (not shown) for mounting directly to a pole or other support means (not shown). In the preferred embodiment, the body portions 14, 16 are cast aluminum pieces for supporting high tension power transmission cables. However, other metals, composites, plastics, or the like can also be used, particularly for power cables transmitting at low power or for communication cables.

The body portions 14, 16 define a pair of opposed cable receiving regions 18, 20 that cooperate to form a cable channel 22 which holds the clamped portion of the cable 12. Additionally, cable cushions 24 are provided as needed in the cable channel 22 near the ends of the cable channel 22. The cushions 24 absorb wind-induced vibrations and reduce cable abrasion, wear, and fatigue. The cushions 24 are formed of EPDM, neoprene, silicone, or other suitable material using extrusion or compression molding.

Figure 3:
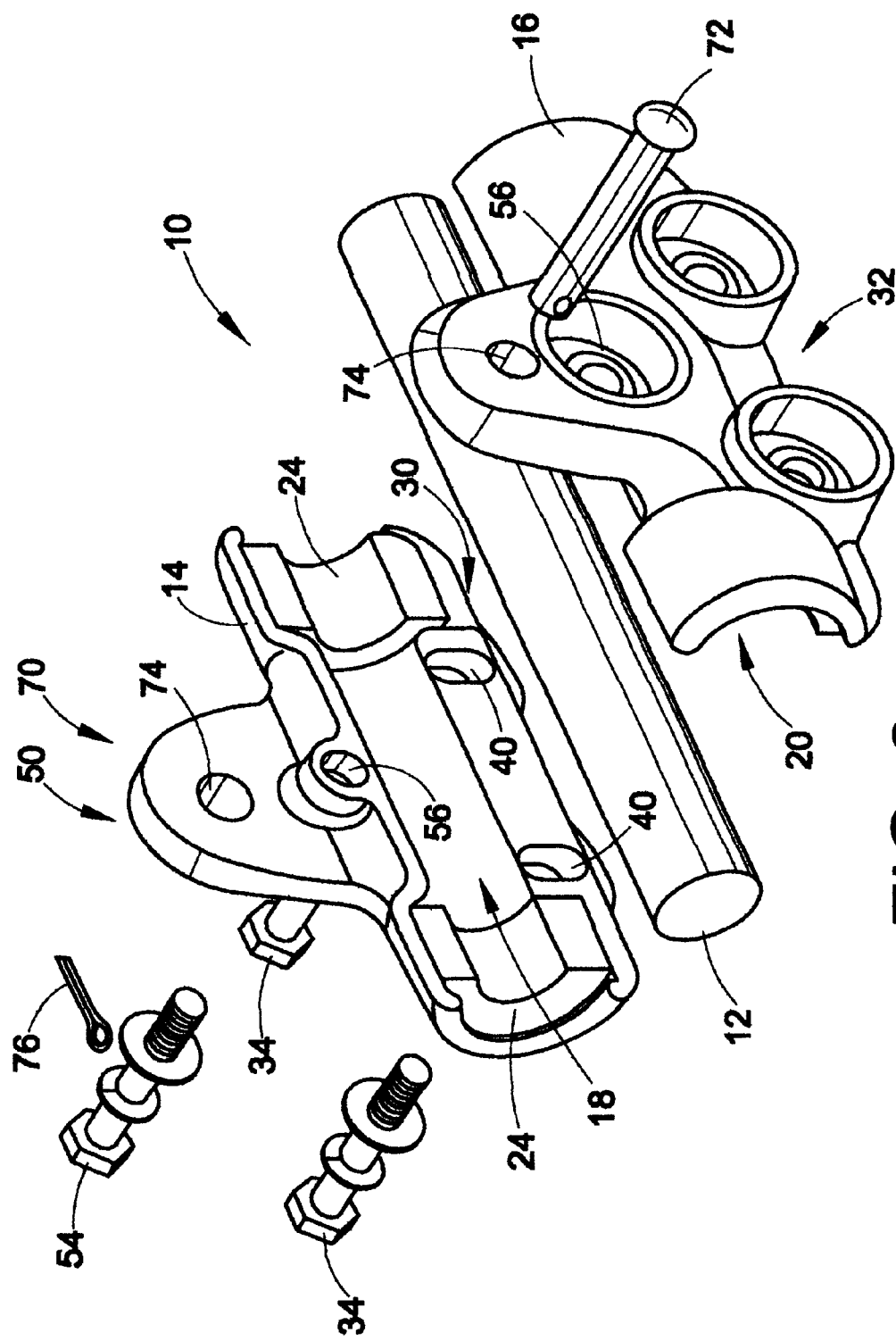
FIG. 3 shows an exploded isometric view of the clamp of FIG. 1.
Figure 4:
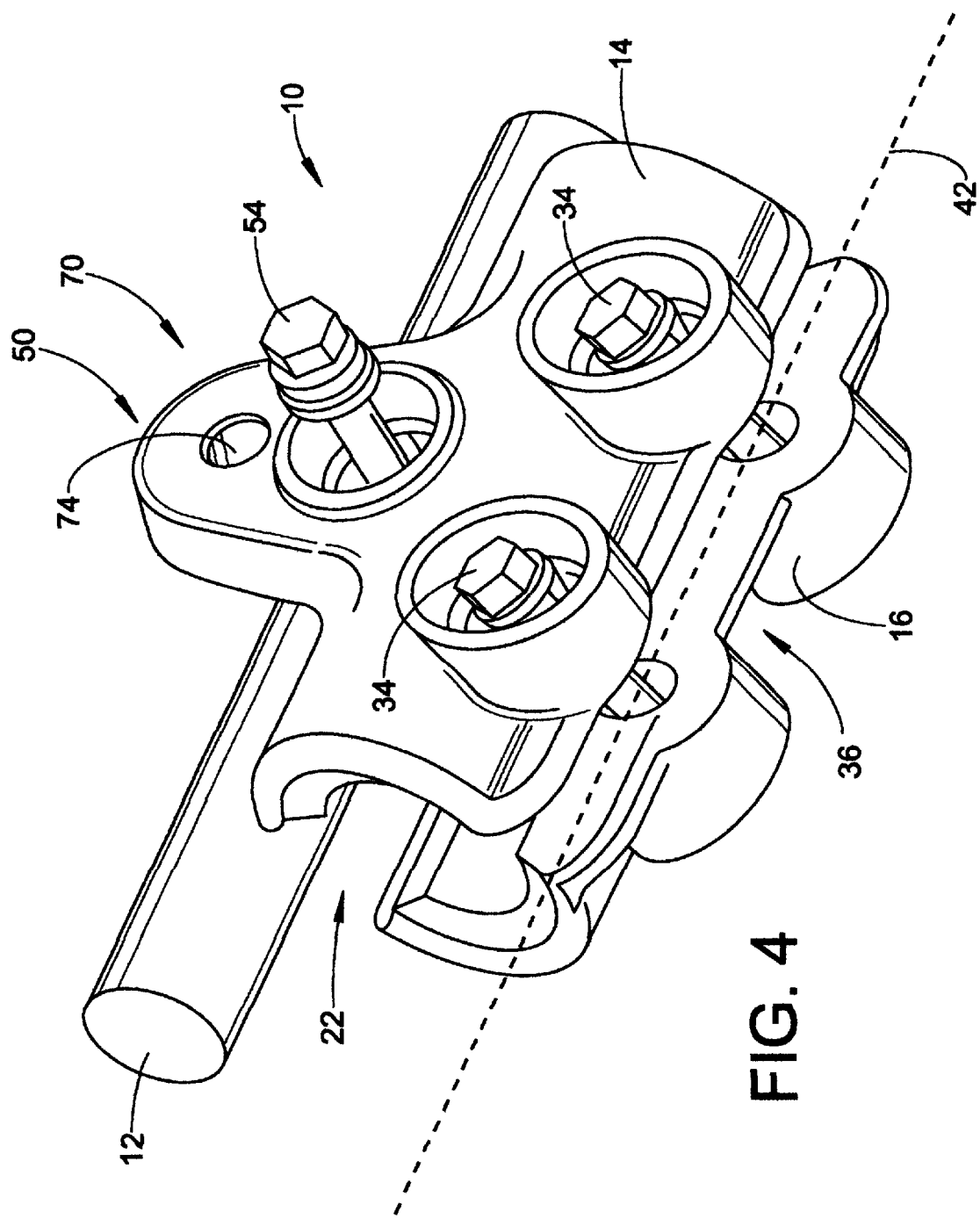
FIG. 4 shows a preferred method for inserting a cable into the clamp of FIG. 1 without disassembling the hinge of the clamp.

Each of the body portions 14, 16 include a hinge region 30, 32 that cooperate with one another and with a set of bolt-and-nut fastener pairs 34 to form a hinge 36. Hinging action is obtained when the fasteners 34 are inserted through oblong holes 40 (best seen in FIG. 3) in the hinge regions 30, 32. The oblong holes 40 allow the bolt-and-nut fastener pairs 34, when loosened, to articulate within fixed limits established by the size of the oblong holes 40 and the extent of loosening of the fasteners 34. The articulation allows the body portions 14, 16 to pivot essentially about a hinge axis 42, as shown in FIG. 4. The pivoting opens a compression region 50 arranged on an opposite side of the cable channel 22 away from the hinge regions 30, 32, through which the cable 12 is inserted, as best seen in FIG. 4. In a suitable cable installation process, the fasteners 34 are loosened only enough so that the compression region 50 can be opened sufficiently to insert the cable 12. The body portions 14, 16 remain hingeably connected in the hinge region 36 throughout the cable 12 installation.

After the cable 12 is received in the cable channel 22, the clamp 10 is tightened to effectuate clamping. The fasteners 34, which were preferably only slightly loosened to allow cable installation, are re-tightened. Additionally, a tightener member 54 cooperates with the compression region 50 to compress the body portions 14, 16 against the cable 12 by hingeably pivoting the body portions 14, 16 about the hinge 36. The cushions 24 are also compressed against the cable 12. Alternatively, the cushions 24 extend into the hinge region 36 and are compressed by the hinge as well. This reduces the possibility that the cushions 24 will slip out of place during clamp 10 installation, and provides a more stable cushioning for the cable 12 at the regions where it extends out of the clamp 10.

In the preferred embodiment, the tightener member 54 includes a bolt-and-nut fastener 34 of the same type used in forming the hinge 36, which passes through holes 56 in the compression region 50 of the body portions 14, 16. The holes 56 are best seen in FIG. 3.

Those skilled in the art will recognize that the preferred embodiment illustrated in FIGS. 1 through 4 is exemplary only. Other equivalent mechanical arrangements can be used to construct the hinge 36 and the tightener 54.

Figure 5:
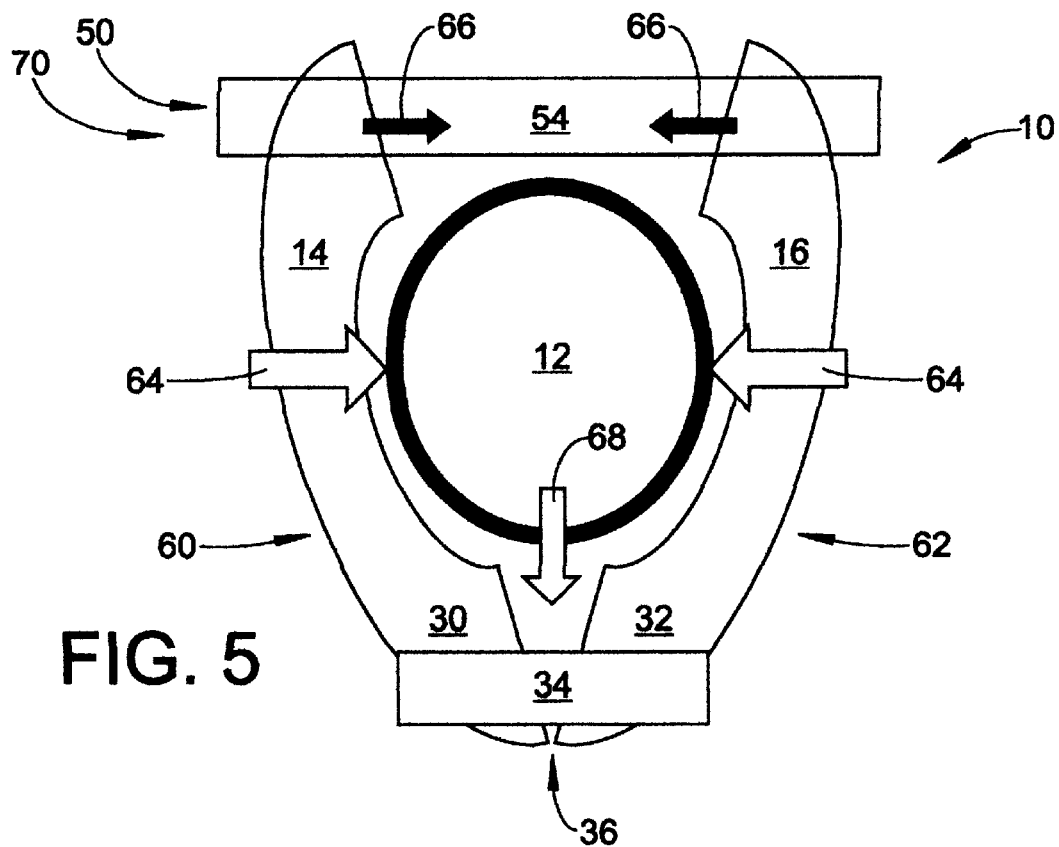
FIG. 5 schematically shows the hinge and the tightener acting on each of the pair of clamp body portions to form cooperating second-class levers that compressively fasten onto the associated cable.

With reference to FIG. 5, a schematic diagram shows the hinge 36 and the tightener 54 acting on each of the pair of clamp body portions 14, 16 to form cooperating second-class levers 60, 62 that compressively fasten onto the associated cable 12. As second-class levers 60, 62, the resistance 64 is arranged between the fulcrum (corresponding to the hinge 36) and the applied force 66 generated by the tightener 54. The second-class lever operation shown in FIG. 5 occurs in pure form only if the hinge fasteners 54 are tightened prior to applying the tightener 54. This closely approximates the preferred operation, since the hinge fasteners 34 are preferably only slightly loosened to allow cable 12 insertion and are then tightened at least partially before inserting and applying the tightener 54.

However, in the preferred embodiment of the subject clamp illustrated in FIGS. 1 through 4, it is contemplated that once the cable is inserted and the fasteners 34 and tightener 54 are "finger-tight", that the hinge fasteners 34 are tightened essentially together with the tightener 54 to effectuate firm clamping of the cable 12. That is, although the hinge 36 operates as a swinging hinge for cable 12 insertion and initial clamping, the final tightening (e.g., using a wrench or other tools) of the clamp 10 is performed using both the tightener 54 and the fasteners 34 of the hinge regions 30, 32. This promotes an even and firm clamping force that is produced by tightening elements 34, 54 on both sides of the cable 12.

With continuing reference to FIGS. 1 through 4, during use, the clamp 10 is suspended via a suspending region 70 arranged in the clamp 10 essentially coincident with the compression region 50. Cable and clamp suspension is obtained using a transverse rod 72 secured in holes 74 of the suspending region 70. The rod 72 is secured in the suspending region 70 using a cotter pin 76. The inserted rod 72 is used as a connecting means for connecting the clamp 10 to a support. For example, in FIG. 2 an associated supporting loop 80 is shown. The suspending region 70 is exemplary only, and many other equivalent configurations are also contemplated. Further, the suspending region 70 need not be coincident with the compression region 50. For example, it is also possible to arrange the suspending region into the hinge 36, or to modify one or both of the two clamp body portions 14, 16 to form a suspending region therein.

Figure 2:
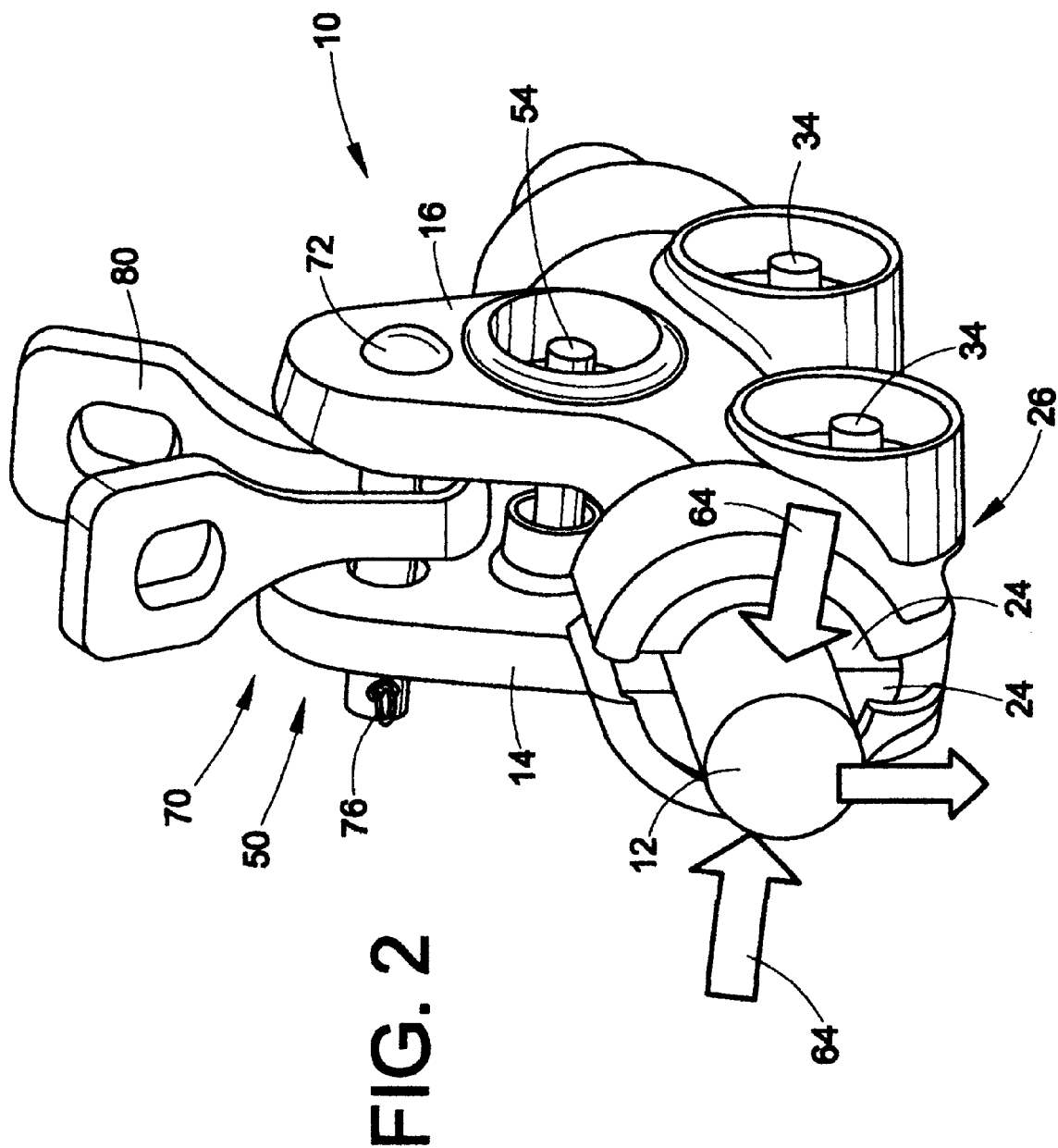
FIG. 2 shows the embodiment of FIG. 1 with a connecting element for suspending the clamp and affixed cable from a support structure.

With particular reference next to FIGS. 2 and 5, those skilled in the art will recognize that the configuration of the clamp 10 advantageously produces a clamping force 64 in the horizontal plane directed at right angles (substantially perpendicular) to a bending stress 68 generated by the cable weight. This reduces the maximum total stress on the cable. The cushions 24 in particular are pressed toward the cable 12 from the left-and-right, and these forces do not additively combine with the bending stress 68.

Figure 6:
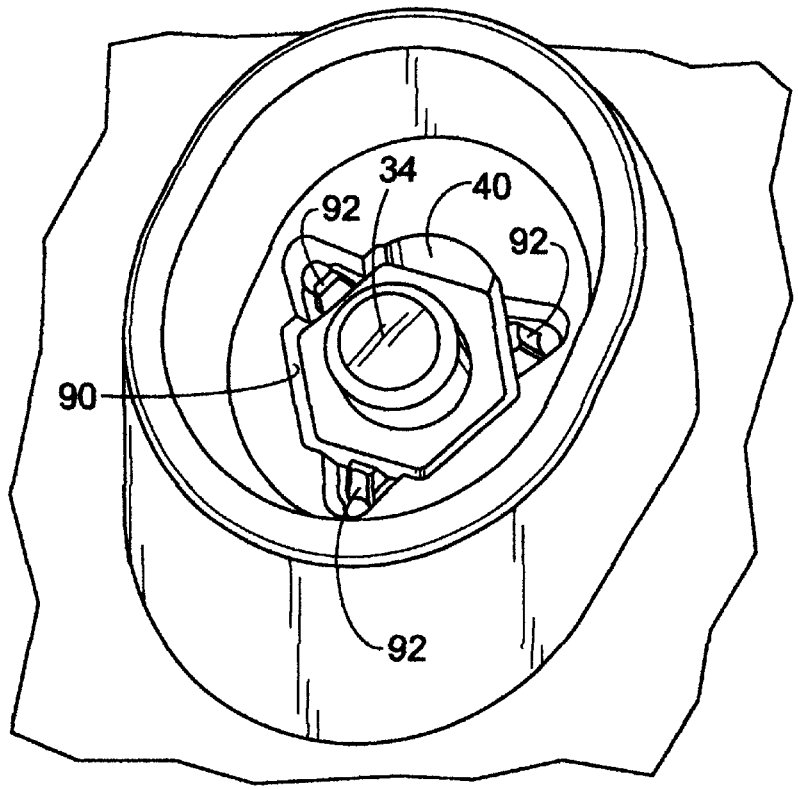
FIG. 6 shows an enlarged isometric view of the nut portion of an exemplary bolt-and-nut fastener inserted into the oblong hole having a recess for non-rotatably holding the nut, and staking pins for capturing the fastener hardware.

With continuing reference to FIGS. 1 through 4, and with further reference to FIG. 6, the clamp 10 further alleviates problems with loose and missing parts that were frequently encountered in prior cable clamps by arranging the nut portions of the fasteners 34 as captive hardware. As best seen in FIG. 6, the nut is inserted into a recess 90 formed into the oblong hole 40. The recess 90 has flat inwardly facing surfaces that match the outer faces of the nut thereby holding the nut in place in a non-rotating fashion. Once the nuts are so inserted, staking pins 92 which are preferably cast into the body portions 14, 16 are deformed and pressed toward the nut to secure and retain the nut in the recess 90. In addition to retaining the nut, this arrangement also holds the nut in non-rotating fashion so that the bolt-and-nut fastener 34 can be tightened using only one wrench or other tool applied to the bolt head. The arrangement of FIG. 6 is also preferably applied to the nut of the tightener 54. Those skilled in the art will also appreciate that the fasteners 34 can alternatively have the bolt of the bolt-and-nut fastener 34 non-rotatably retained in the described manner, in which case the nut remains free for selective tightening.

Figure 7:
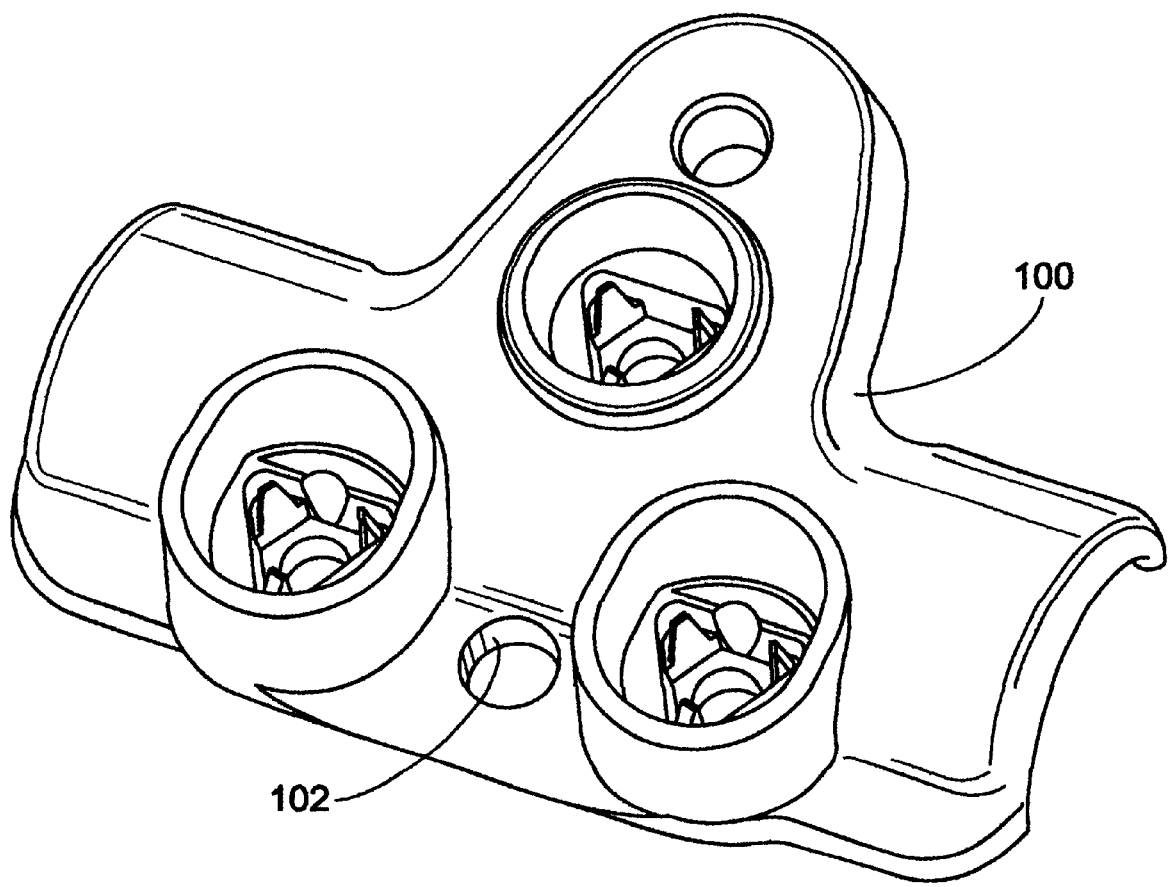
FIG. 7 shows an isometric view of one body piece of another exemplary cable suspension clamp that includes a lifting hole.

With reference to FIG. 7, a modified body portion 100 is described of a second preferred embodiment. The body portion 100 is essentially similar to the body portions 14, 16 except that it includes a lifting hole 102. The lifting hole 102 is used to lift the clamp in an upside-down orientation over and onto an electrified high tension cable 12, using an associated fiberglass or other insulating lifting pole (not shown). The clamp hinge 36 is left open during the lifting with the tightener 54 removed (except optionally for a retained captive nut). The clamp is draped onto the hot installed cable 12. The human installer then inserts and partially tightens the tightener 54 and the fasteners 34, rotates the clamp into the appropriate position for suspension, and completes the clamping. The recesses 90 advantageously hold the nuts in place rotatably relative to the housing members to simplify the tightening operation. Thus, the installation is easy and safe for the installer.

In one test, a clamp manufactured in accordance with the preferred embodiment of the invention described above underwent 23,000,000 vibration cycles with a large vibration amplitude equal to the diameter of the clamped cable. The cable exhibited no breaks inside the clamp, and the clamp exhibited no failures.

In a short circuit test, a clamp formed in accordance with the invention was used to support a cable carrying a 1000 ampere current to test the thermal integrity of the clamp. No failure was observed, and in particular the cushions were undamaged.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A cable clamp comprising:
   two interchangeable half-portions, each half-portion having:
      an outer side,
      an inner side defining a cable receiving region,
      a hinge region arranged adjacent the cable receiving region, and
      a suspending region arranged adjacent the cable receiving region and opposite from the hinge region, the suspending region adapted to receive an associated support element, the two half-portions adapted to cooperatively form a unitary cable clamp body having a cable channel defined by the cable receiving regions of the interchangeable half-portions and a hinge defined by the hinge regions of the interchangeable half-portions; and, a tightener for drawing the half-portions together about the hinge to clamp an associated cable within the cable channel.

2. The cable clamp as set forth in claim 1, further including:

at least one cushion arranged at an end of the cable channel for cushioning the associated cable extending out of the clamp.

3. The cable clamp as set forth in claim 2, wherein the at least one cushion includes:

two half-cushions, each half-cushion arranged within the cable receiving region of one of the half-portions.

4. The cable clamp as set forth in claim 3, wherein each half-cushion includes:

a hinge cushion portion compressively received within the hinge.

5. The cable clamp as set forth in claim 2, wherein the at least one cushion is formed of EPDM, neoprene, or silicone.

6. The cable clamp as set forth in claim 1, wherein the hinge further includes:

a fastener that connects the hinge regions of the two half-portions together to form the hinge.

7. The cable clamp as set forth in claim 6, wherein the hinge further includes:

a retaining element for retaining the fastener in the hinge.

8. The cable clamp as set forth in claim 6, wherein the hinge portions further include:

molded extensions deformable to retain the fastener in the hinge.

9. The cable clamp as set forth in claim 6, wherein the tightener includes:

a tightening fastener that draws the suspending regions of the two half-portions together, the tightening fastener being interchangeable with the fastener.

10. The cable clamp as set forth in claim 1, wherein the hinge further includes:

at least two bolt-and-nut fasteners that cooperate with oblong holes in the hinge regions to hingeably connect the hinge regions.

11. The cable clamp as set forth in claim 10, wherein at least one of the nut and the bolt is captive hardware.

12. The cable clamp as set forth in claim 10, wherein each oblong hole includes:

a recess adapted to receive at least one of the nut and a head of the bolt in non-rotatable fashion.

13. The cable clamp as set forth in claim 12, wherein the recess is deeper than the nut, and the edges of the recess are deformable about the nut to retain the nut captive in the recess.

14. The cable clamp as set forth in claim 10, wherein the hinge region further includes:

stake pins arranged near the oblong hole that are deformable to retain at least one of the nut and the bolt in the hinge.

15. The cable clamp as set forth in claim 1, wherein a clamp force is exerted against the associated cable at right angles to a bending stress of the associated cable.

16. The cable clamp as set forth in claim 1, further including at least one cushion arranged between the half-portions for cushioning the associated cable.

17. The cable clamp as set forth in claim 16, wherein the at least one cushion includes at least two half-cushions.

18. The cable clamp as set forth in claim 17, wherein the at least two half-cushions are disposed in said cable channel.

19. The cable clamp as set forth in claim 16, wherein the at least one cushion is formed of EPDM, neoprene, or silicone.

20. A piece comprising:

an outer side;

an inner side including a cable receiving region;

a hinge region arranged below the cable receiving region; and, a suspending region arranged above the cable receiving region, the suspending region adapted to receive an associated support element; wherein, the piece is adapted to cooperate with a substantially identical second piece to form a unitary cable retaining body having a cable channel defined by cooperating cable receiving regions, a hinge including cooperating hinge regions and an associated hinge fastening element, and a clamping element arranged to pivotally close the cooperating pieces about the hinge.

21. A cable-retaining device comprising:

a hinged pair of elements adapted to receive an associated cable therebetween; and, a clamp adapted to compress the hinged pair of elements together to fasten about the associated cable, the pair of elements including a lifting portion to enable the device to be moved onto the associated cable with the hinged pair of elements in an open position.

22. The cable-retaining device as set forth in claim 21, wherein the hinged pair of elements includes a cable channel defined by the pair of elements.

23. The cable-retaining device as set forth in claim 21, further including a cushion element selectively disposed within the cable channel for cushioning at least a portion of the associated cable.

24. The cable-retaining device as set forth in claim 21, wherein the clamp is adapted to act on each of the pair of elements to form cooperating second-class levers that compressively fasten onto the associated cable.

25. The cable-retaining device as set forth in claim 21, wherein each of the pair of elements includes a lifting hole.

26. A cable clamp comprising:

first and second interchangeable body members cooperatively forming a unitary clamp body having a cable channel, a hinge region arranged on a side of the cable channel, and a compression region arranged on an opposite side of the cable channel away from the hinge region;

a hinge fastener hingeably attaching the first and second body members in the hinge region; and, a tightening member adapted to draw the first and second body members together at the compression region to compressively hold an associated cable arranged within the cable channel.

27. The cable clamp as set forth in claim 26, wherein the hinge fastener non-detachably attaches the first and second body members in the hinge region.

28. The cable clamp as set forth in claim 26, further including:

at least one cushion arranged within the cable channel for cushioning at least a portion of the associated cable clamped therein.

29. The cable clamp as set forth in claim 26, wherein the hinge fastener compressively attaches the first and second body members in the hinge region, the compressive attaching cooperating with the tightening member to compressively hold the associated cable arranged within the cable channel.

30. The cable clamp as set forth in claim 26, wherein the compressive hold of the associated cable includes compressive forces directed in a plane transverse said cable channel.

31. The cable clamp as set forth in claim 26, wherein the first and second body members are substantially identical.

32. A cable clamp comprising:

first and second interchangeable clamp members that together define a clamp body;

a hinge formed into a lower portion of the clamp body;

a tightening member disposed in an upper portion of the clamp body; and a cable channel formed into the clamp body and arranged between the hinge and the tightening member.

33. The cable clamp as set forth in claim 32, wherein the first clamp member and the second clamp member are identically formed.

34. The cable clamp as set forth in claim 33, wherein the identically formed clamp members include cast aluminum members.

35. The cable clamp as set forth in claim 32 wherein at least one of the first and second clamp members defines a suspending region adapted to couple with an associated support element.

36. The cable clamp as set forth in claim 32, wherein at least one of the first and second clamp members defines a lifting hole to enable the clamp body to be moved onto an associated cable with the hinge in an open position.

37. The cable clamp as set forth in claim 32 wherein:

at least one of the first and second clamp members defines a suspending region adapted to couple with an associated support element; and, at least one of the first and second clamp members defines a lifting hole to enable the clamp body to be moved onto an associated cable with the hinge in an open position.

38. An article of manufacture forming a portion of a cable clamp, the article of manufacture comprising:

a housing having opposite first and second sides, the first side defining a cable receiving region, the housing further defining a hinge region and a suspending region arranged on opposite sides of the cable receiving region, the suspending region being adapted to receive an associated support element, wherein:

the housing is adapted to cooperate with a substantially identical second housing to form a unitary cable retaining body having a cable channel defined by cooperating cable receiving regions, a hinge defined by cooperating hinge regions, and a clamping element arranged to pivotally close the cooperating housings about the hinge.

39. A cable clamp comprising:

two identical half-portions, each half-portion having an outer side, an inner side defining a cable receiving region, and a hinge region arranged adjacent the cable receiving region, the two half-portions adapted to cooperatively form a unitary cable clamp body having a cable channel defined by the cable receiving regions of the half-portions and a hinge defined by the hinge regions of the half-portions; and, a tightener holding the half-portions together about the hinge to clamp an associated cable within the cable channel.

40. The cable clamp as set forth in claim 39, further including at least one cushion received in the cable channel.

41. The cable clamp as set forth in claim 40, wherein the at least one cushion is formed of EPDM, neoprene, or silicone.

42. The cable clamp as set forth in claim 39, further including a set of cushions spaced apart along said cable channel.

43. The cable clamp as set forth in claim 42, wherein the hinge further includes a retaining element for retaining the fastener in the hinge.

44. The cable clamp as set forth in claim 44, wherein the hinge regions further include molded extensions deformable to retain the fastener in the hinge.

45. The cable clamp as set forth in claim 39, wherein the hinge further includes a fastener operatively connecting the hinge regions of the half-portions together to form the hinge.

46. The cable clamp as set forth in claim 39, wherein the hinge further includes at least two bolt-and-nut fasteners that cooperate with oblong holes in the hinge regions to hingeably connect the hinge regions.

47. The cable clamp as set forth in claim 46, wherein at least one of the nut and the bolt is held captive relative to the half-portions.

48. The cable clamp as set forth in claim 46, wherein each oblong hole includes a recess adapted to receive at least one of the nut and a head of the bolt in non-rotatable fashion.

49. The cable clamp as set forth in claim 48, wherein the recess is deeper than the nut, and the edges of the recess are deformable about the nut to retain the nut captive in the recess.

50. The cable clamp as set forth in claim 46, wherein the hinge region further includes stake pins arranged near the oblong hole that are deformable to retain at least one of the nut and the bolt in the hinge.

51. The cable clamp as set forth in claim 39, wherein a clamp force is exerted against the associated cable at right angles relative to a bending stress of the associated cable.

* * * * *